United States Patent [19]
Williams et al.

[11] Patent Number: 5,872,703
[45] Date of Patent: Feb. 16, 1999

[54] SYSTEM AND METHOD FOR REGULATING POWER IN TANK CIRCUITS HAVING A BRIDGE CONFIGURATION

[75] Inventors: Martin A. Williams; Austin L. Widener, both of Perry, Okla.; Michael A. Wilson, Oak Ridge, Tenn.

[73] Assignee: The Charles Machine Works, Inc., Perry, Ohio

[21] Appl. No.: 918,242

[22] Filed: Aug. 25, 1997

[51] Int. Cl.$^6$ .................................................. H02M 3/335
[52] U.S. Cl. .................. 363/17; 363/132; 363/98
[58] Field of Search ................ 363/17, 132, 98

[56] References Cited

U.S. PATENT DOCUMENTS

| | | | |
|---|---|---|---|
| 3,775,765 | 11/1973 | Di Piazza et al. | 343/5 R |
| 4,028,633 | 6/1977 | Rogers et al. | 330/118 |
| 4,047,120 | 9/1977 | Lord et al. | 330/207 P |
| 4,213,103 | 7/1980 | Birt | 332/9 T |
| 4,217,551 | 8/1980 | Entenman | 375/88 |
| 4,245,191 | 1/1981 | Schroeder | 324/337 |
| 4,346,354 | 8/1982 | Hanna | 332/43 B |
| 4,458,204 | 7/1984 | Weber | 324/326 |
| 4,486,713 | 12/1984 | Gifford | 324/329 |
| 4,532,480 | 7/1985 | Gerard | 330/286 |
| 4,757,432 | 7/1988 | Hancock | 363/17 |
| 4,823,249 | 4/1989 | Garcia, II | 363/48 |
| 4,920,474 | 4/1990 | Bruning et al. | 363/97 |
| 4,935,857 | 6/1990 | Nguyen et al. | 363/17 |
| 4,952,890 | 8/1990 | Swanson | 332/152 |
| 4,980,898 | 12/1990 | Silvian | 375/59 |
| 5,057,698 | 10/1991 | Widener et al. | 363/17 |
| 5,146,395 | 9/1992 | McKie | 363/13 |
| 5,239,275 | 8/1993 | Leitch | 332/152 |
| 5,245,520 | 9/1993 | Imbertson | 363/17 |
| 5,410,280 | 4/1995 | Linguet et al. | 332/149 |
| 5,410,467 | 4/1995 | Smith et al. | 363/131 |
| 5,465,418 | 11/1995 | Zhou et al. | 455/332 |
| 5,486,793 | 1/1996 | Hill | 331/56 |
| 5,510,974 | 4/1996 | Gu et al. | 363/134 |
| 5,513,389 | 4/1996 | Reeser et al. | 455/311 |

*Primary Examiner*—Shawn Riley
*Attorney, Agent, or Firm*—McKinney & Stringer, P.C.

[57] ABSTRACT

A system for regulating an alternating current voltage source has a pair of P-channel MOSFETs and a pair of N-channel MOSFETs in a bridge configuration with an inductor-capacitor tank there between. A processor in conjunction with a feedback circuit regulates the energy transferred to the tank by modulating the pulse width of signals that are output from the processor and which are used as inputs to the gates of the MOSFETs. By increasing or decreasing the pulse widths transmitted to the various gates of the MOSFETs, the processor increases or decreases the energy transferred to the tank. The feedback circuit is connected between the tank and the processor so that the processor can compare the feedback voltage from the tank to a threshold level in the processor and modify the pulse widths at the output of the processor accordingly.

34 Claims, 7 Drawing Sheets

SYSTEM AND METHOD FOR REGULATING POWER IN TANK CIRCUITS HAVING A BRIDGE CONFIGURATION

FIELD OF THE INVENTION

The present invention relates generally to the field of power regulation for circuits that generate an alternating current power source and, in particular, to systems and methods for controlling power in the tank of an antenna of an underground boring device.

BACKGROUND OF THE INVENTION

Many electrical systems have circuits that use inductor and capacitor tanks to provide a fixed frequency output from a voltage source. These outputs are used in a variety of applications, including radio transmissions and radio frequency generations.

In many of these systems, the loading characteristics of a tank are substantially fixed. When the load is fixed and constant, a fixed drive level provides a constant amplitude of energy to the tank. In addition, if a system has a constant voltage power source, low impedance bridge circuits provide a stable and repeatable drive level.

However, when the load is variable, a constant drive level does not provide a constant power amplitude level to the tank. Moreover, if the voltage source of a system is not constant, bridge circuits do not provide a constant drive level.

In addition, in systems that are battery operated, a power inverter is typically used to provide the constant voltage source because the voltage level drops as the life of the battery increases. Unfortunately, power losses typically are associated with the use of such power inverters as the power inverter attempts to stabilize the variable battery voltage.

For example, in the prior art half-bridge circuit of FIG. 1, the power source is applied directly to the series inductor-capacitor (LC) tank. The half-bridge configuration has an input and an output divided between two identical devices, each operating in phase opposition with respect to the other. In this instance, the output is the tank which is center tapped with respect to a P-channel metal oxide semiconductor field effect transistor (MOSFET) and an N-channel MOSFET. Thus, one side of the circuit carries current from battery to ground through the tank, and the other side of the circuit operates in phase opposition. However, as the battery life increases, the power delivered to the tank will vary and decrease, thus changing and decreasing the power radiated from the tank.

In the prior art system of FIG. 2, a full-bridge circuit uses an inverter to alternately provide power to the tank. However, the power level merely is alternated, and the power drive level to the tank is not controlled or regulated to provide a constant drive level. Therefore, the same power loss problem occurs in the system of FIG. 2 when the battery life increases.

Thus, a system and method are required to provide a constant drive level for a tank in a drive circuit. An improved system is needed to modulate the power provided to the tank of the drive circuit and to control the modulation to provide a fixed drive level when variations in the power level of the power source exist or when variations in the tank load exist.

SUMMARY OF THE INVENTION

The present invention comprises a system for regulating power in a circuit comprising a pair of complimentary MOSFETs in a bridge configuration with a tank circuit connected between the pair of complimentary MOSFETs. A voltage source provides a voltage through the pair of complimentary MOSFETs to drive the tank circuit, and a square wave generator adapted to output a square wave to each of the pairs of complementary MOSFETs. A phase delay circuit is connected between the square wave generator and one of the pair of complimentary MOSFETs. The phase delay circuit is adapted to modulate a phase of the square wave to the one pair of complimentary MOSFETs thereby varying an amount of the voltage that is provided through the complimentary MOSFETs at a controlled level.

In another aspect, the present invention is a system for regulating power in a circuit comprising a voltage source adapted to provide a voltage with a level. A pair of complementary MOSFETs are in a bridge configuration. The pair of complementary MOSFETs comprises two sets of complementary MOSFETs. A first set of complementary MOSFETs create a first circuit path when gated. A second set of complementary MOSFETs create a second circuit path when gated. A tank circuit is connected between the pair of complementary MOSFETs and is adapted to receive the level of voltage alternately through the first circuit path and alternately through the second circuit to create an alternating current regulated voltage source. A processor has a feedback input from the tank and a first output to a first side of opposing MOSFETs. The first side of opposing MOSFETs comprises one MOSFET from the first set of complementary MOSFETs and one MOSFET from the second set of complementary MOSFETs. The processor has a second output to a second side of opposing MOSFETs. The second side of opposing MOSFETs comprises another MOSFET from the first set of complementary MOSFETs and another MOSFET from the second set of complementary MOSFETs. The processor is adapted to compare the feedback input to a set threshold level to determine a first pulse width having a first logic level to be output on the first output and a second pulse width having a second logic level to be output on the second output so that the level of voltage transferred to the tank is controlled by varying modulations and logic levels of the first pulse width and the second pulse width.

In still another aspect, the present invention is a system for regulating power in a circuit comprising a voltage source adapted to provide a voltage with a level. A first and a second P-channel MOSFET each have a source, a drain, and a gate. The source of the first P-channel MOSFET and the source of the second P-channel MOSFET are connected to the voltage source at a positive terminal. A first and a second N-channel MOSFET each have a source, a drain, and a gate. The source of the first N-channel MOSFET and the source of the second N-channel MOSFET are connected to the voltage source at a ground. A tank circuit is connected between the drains of the first P-channel MOSFET and the first N-channel MOSFET and the drains of the second P-channel MOSFET and the second N-channel MOSFET so that the voltage level is transferred to the tank through a circuit path through two of the MOSFETs. A processor has a feedback input from the tank, a first output to the gates of the first P-channel MOSFET and the first N-channel MOSFET, and a second output to the gates of the second P-channel MOSFET and the second N-channel MOSFET. The processor is adapted to compare the feedback input to a set threshold level to determine a first pulse width having a first logic level to be output on the first output and a second pulse width having a second logic level to be output on the second output so that the level of voltage transferred to the tank is controlled by varying modulations and logic levels of the first pulse width and the second pulse width.

In yet another aspect, the present invention is a system for regulating power in a circuit comprising a voltage source adapted to provide a voltage with a level. A first and a second P-channel MOSFET have a source, a drain, and a gate. The source of the first P-channel is connected to the voltage source at a positive terminal, and the drain of the second P-channel MOSFET is connected to ground. A first and a second N-channel MOSFET each have a source, a drain, and a gate. The drain of the first N-channel MOSFET is connected to the voltage source at the positive terminal, and the source of the second N-channel MOSFET is connected to ground. The drain of the first P-channel MOSFET is connected to the drain of the second N-channel MOSFET. The source of the first N-channel MOSFET is connected to the source of the second P-channel MOSFET. A tank circuit is connected between the drains of the first P-channel MOSFET and the second N-channel MOSFET and the sources of the first N-channel MOSFET and the second P-channel MOSFET so that the voltage level is transferred to the tank through a circuit path through two of the MOSFETs. A processor has a feedback input from the tank, a first output to the gates of the first P-channel MOSFET and the second N-channel MOSFET, and a second output to the gates of the first N-channel MOSFET and the second P-channel MOSFET. The processor is adapted to compare the feedback input to a set threshold level to determine a first pulse width having a first logic level to be output on the first output and a second pulse width having a second logic level to be output on the second output so that the level of voltage transferred to the tank is controlled by varying modulations and logic levels of the first pulse width and the second pulse width.

DETAILED DESCRIPTION OF THE PREFERRED EMBODIMENTS

Figure 1:
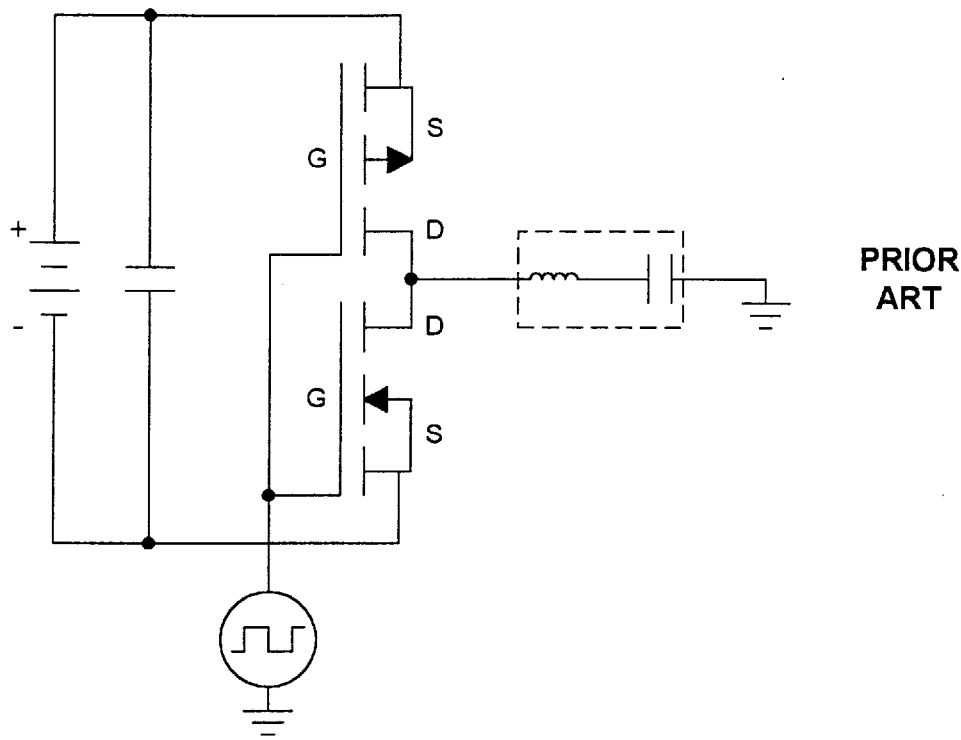
FIG. 1 is a block diagram of a prior art circuit.
Figure 2:
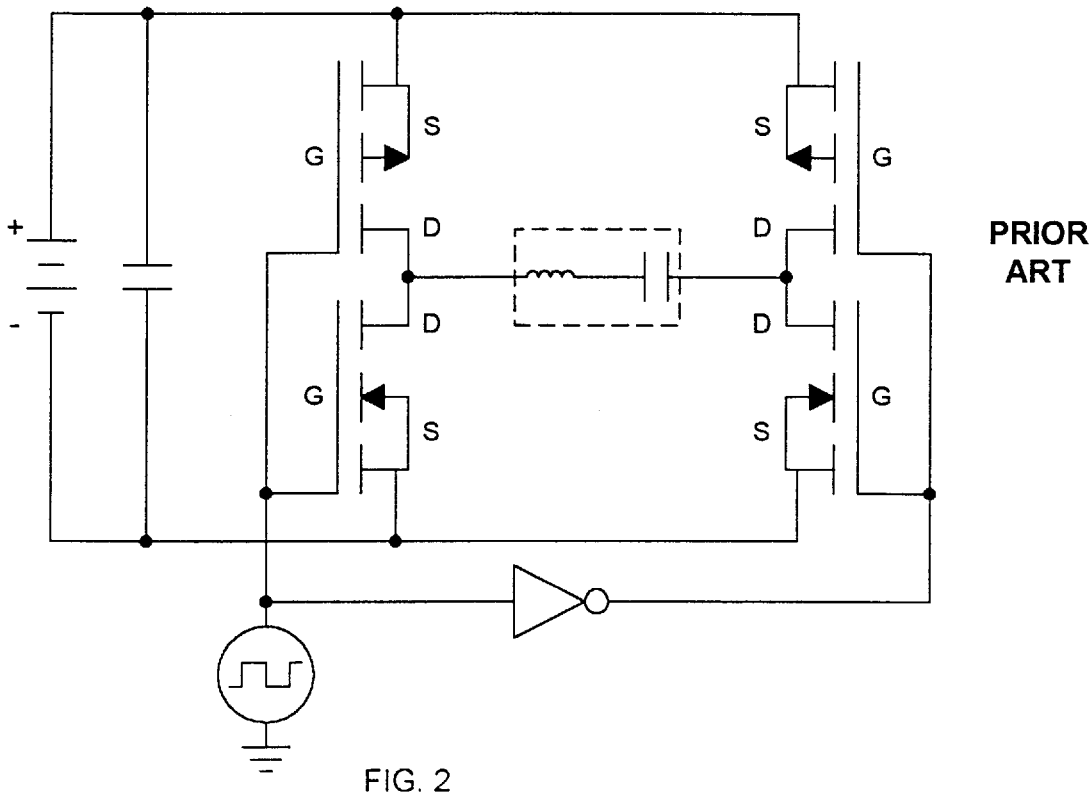
FIG. 2 is a block diagram of a prior art circuit.

The present invention provides an improved system and method for regulating the power provided to a tank in a bridge circuit. One skilled in the art will appreciate that the term "bridge circuit" can include both half-bridge and full-bridge circuit configurations. The present invention provides a constant power level in the tank of a circuit when the tank has a constant or variable voltage source and when the tank has a constant or variable load. The system thereby produces an alternating current (AC) signal through the inductor (L) of the tank at a particular frequency. By controlling the energy stored in the inductor, the system controls the field surrounding the inductor.

The system of the present invention may be used in a variety of applications to generate an AC voltage power source and to regulate the AC voltage source from a regulated direct current (DC) voltage source or an unregulated voltage source. The system may be used as an AC power amplifier by measuring the signal to be amplified and by then applying the desired gain to the circuit to create the amplified signal at the tank. For example, an AC power amplifier may be used to drive small electric motors. The system may also be used to drive an inductive coil or clamp at one or more selected frequencies or as a solenoid or piston drive at a desired frequency.

The present invention particularly is useful for regulating power efficiently to the tank of an antenna circuit in an underground boring drill head. Underground trenchless boring systems have become widely used in a variety of applications, such as utility line installation and replacement, sewer installation, and others. Such underground boring systems reduce the disruption that is associated with open trenches and with trenching technology. For example, underground boring systems are able to bore horizontally under roads and buildings without disrupting the use of the roads and buildings.

Trenchless boring systems typically comprise a boring tool capable of drilling or piercing the earth. The boring tool is launched from a rig above ground and driven by a variety of mechanisms including rotary boring drilling systems, jacking assemblies and pneumatic and non-pneumatic percussive devices. The boring tool is supported on the end of a drill string or air hose, depending on the drive mechanism. Steering mechanisms have been developed for controlling the direction of the boring tool during the boring operation, and various tracking and locating devices have been used for determining the location, pitch angle, and roll angle of the boring tool in the bore hole.

The tracking and steering mechanisms use cooperating transmitting and receiving devices. Typically, the transmitting device is an antenna circuit and system in a beacon or sonde of a drilling tool. The transmitter may transmit a fixed frequency that is used to determine the distance from the receiver to the underground drilling tool. In addition, the transmitter may transmit variable frequency data to carry information to the receiving device.

Figure 3:
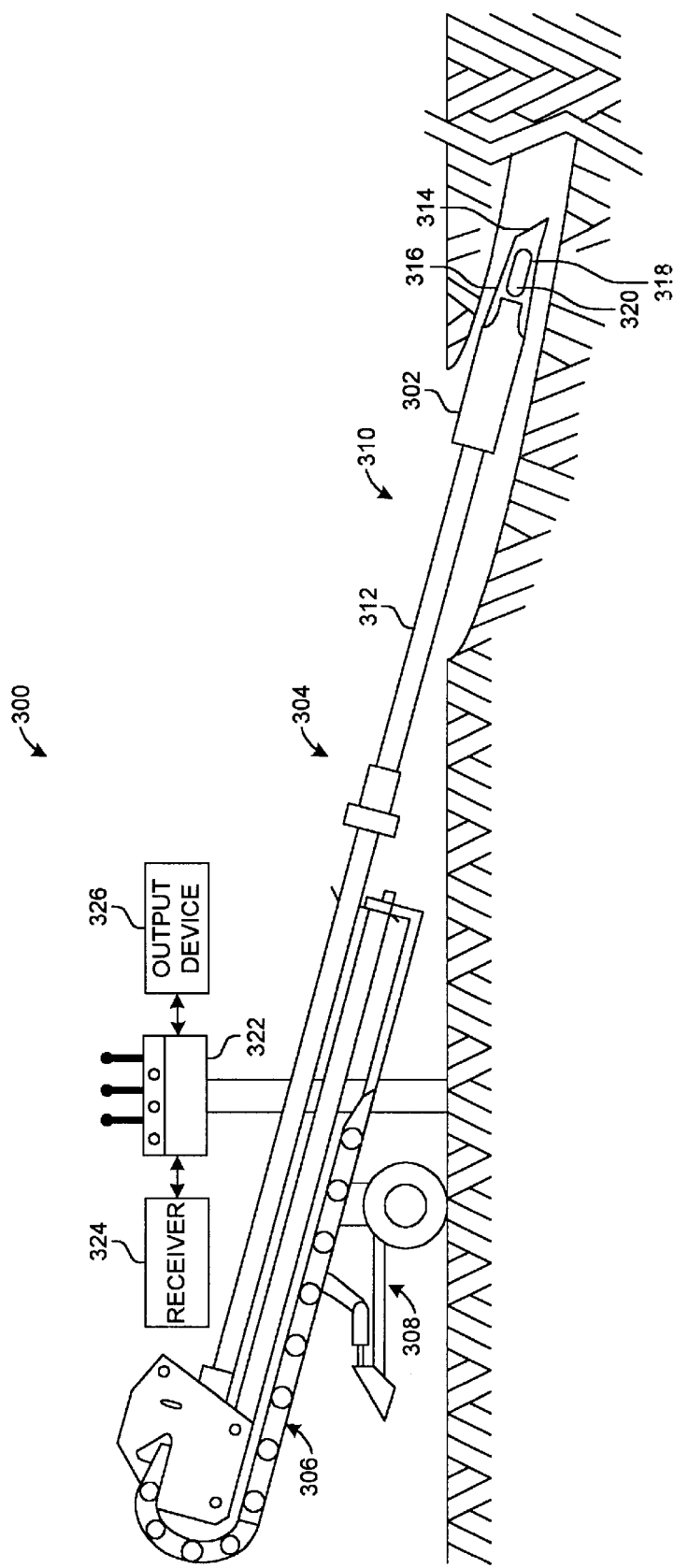
FIG. 3 is a diagrammatic view of a boring assembly attached to a boring tool.

Turning now to the drawings in general and to FIG. 3 specifically, there is shown therein a boring assembly designated generally by the reference numeral 300 and constructed in accordance with the present invention. The boring assembly 300 generally comprises a boring tool 302 adapted to pierce or drill through the earth. The boring tool 302 is controlled by a control system 304 which steers and drives the boring tool 302. In the boring assembly 300 illustrated in FIG. 3, the control system 304 uses a jacking type drive system 306 supported on a rig or trailer 308 at the launch site 310. The boring tool 302 is connected to the jacking system 306 by means of a drill string 312.

The control system 304 includes a steering system incorporated in the jacking system 306 which intermittently rotates the drill string 312 and the boring tool 302. In the system illustrated, the boring tool has a slanted face 314 on its head 316. Thus, as the boring tool 302 is pushed through the earth, it will go straight (in a spiral pattern) if it is continuously rotated. On the other hand, the boring tool 302 will veer in the direction of the slant face 314, if it is pushed through the earth while not rotating. This system enables the operator to guide the direction of the boring tool 302. Many other steering systems are available, however, and this particular system is used for illustration only.

In accordance with present invention, a beacon 318 having a transmitter 320 is installed in the head 316 of the boring tool 302. The transmitter 320 emits a signal by means of a radio frequency. Preferably, directional information carried by the signal is displayed visually to the operator.

The control system 304 usually includes a control panel 322 by which the boring operation is controlled. The nature of the control 322 panel may vary widely depending on the type of drive system and steering system employed. In the jacking system 306 illustrated in FIG. 3, the control panel 322 allows the operator to add or remove joints of drill pipe to or from the drill string 312, to rotate the drill string 312 for steering the boring tool 302, and generally to manage the boring operation.

The control panel 322 is associated with a receiver 324 by which the transmissions from the transmitter 320 are received. In addition, an output device 326 is associated with the control panel 322.

The receiver 324 and the output device 326 may be integrated in the control panel 322 so that they are used by the same operator. Alternately, the receiver 324 and the output device 326 may be separate, hand-held devices used by a second operator walking on the ground generally over the boring tool 302. In this embodiment, the second operator receives directional information with a combination receiver 324 and output device 326 which displays the directional information to the second operator. The second operator then communicates with the first operator at the control panel 322 by means of a two-way radio, a two-way data transmission device, or some like device. In any event, the first operator uses the directional information to make the necessary adjustments to the course of the boring tool.

While the particular boring assembly 300 shown in FIG. 3 uses a jacking mechanism, the term "boring assembly" as used herein is intended to include all types of boring systems regardless of the nature of the drive mechanism. Similarly, the term "boring tool" as used herein includes a variety of permanent or replaceable boring heads, including stepped heads, splined heads, slanted heads, and blunt heads. The boring assembly may use any of a number of methods to assist with the boring, such as water assisted boring, compressed air assisted boring, and others. Similarly, other systems are known for steering a boring tool, such as offset pneumatic hammer mechanisms. Thus, "steering system" as used herein is intended to encompass all types of steering mechanisms.

Figure 4:
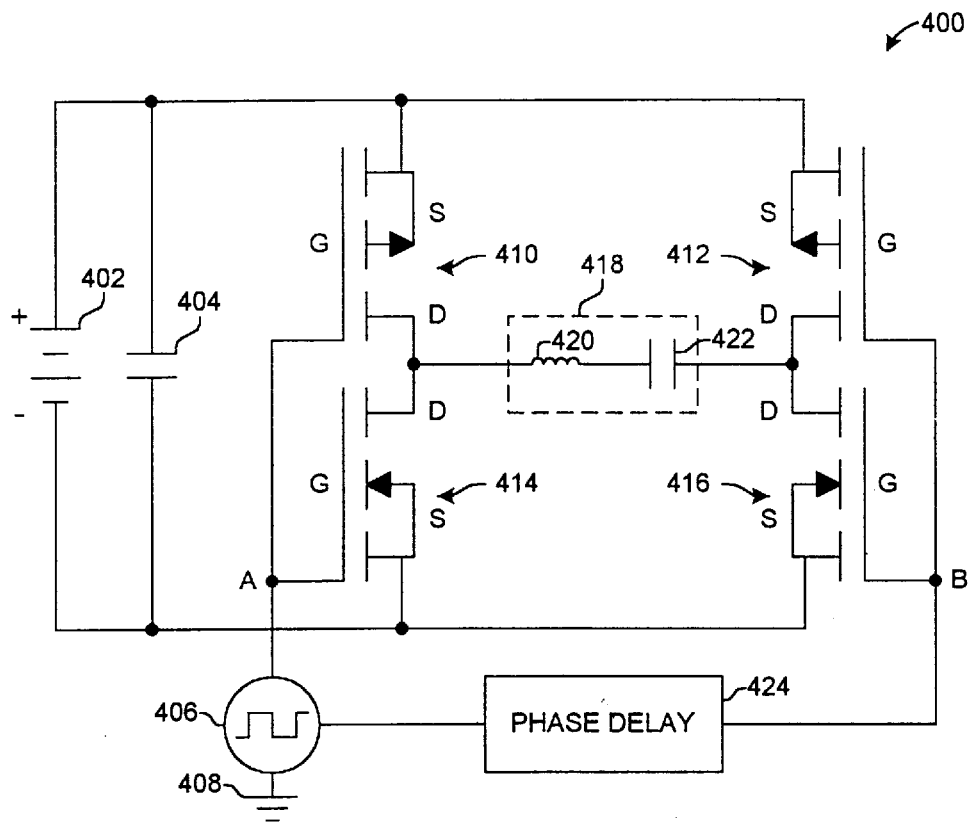
FIG. 4 is a block diagram of a version of a power regulating circuit using phase delay in accordance with the present invention.

With reference now to FIG. 4, a version of the power regulating circuit 400 for a high efficiency antenna in a transmitter includes a phase delay to modulate the drive level of the power sent to the tank. The circuit 400 of FIG. 4 includes a voltage source 402 such as a battery to provide energy to the circuit, a stabilizing capacitor 404 in parallel with the voltage source to stabilize the voltage level from the voltage source, and a square wave generator 406, such as an oscillator circuit, which is connected to ground 408.

The circuit 400 has a low impedance drive circuit, such as for example, a first P-channel MOSFET 410, a second P-channel MOSFET 412, a first N-channel MOSFET 414, and a second N-channel MOSFET 416. However, it will be appreciated that other low impedance drive circuits having different components may be used. For example, switches such as single pole, double throw switches may be used in place of the MOSFETs. Moreover, other configurations of FETs or switches may be used.

The first P-channel MOSFET 410 source and the second P-channel MOSFET 412 source are both connected to the positive terminal of the voltage source 402. The first N-channel MOSFET 414 source and the second N-channel MOSFET 416 source are connected to the negative terminal of the voltage source 402. The combination of the first P-channel MOSFET 410, the second P-channel MOSFET 412, the first N-channel MOSFET 414, and the second N-channel MOSFET 416 will be referred to herein as a pair of complementary MOSFETs.

The drains of the first P-channel MOSFET 410 and the first N-channel MOSFET 414 are tied together. Also, the drains of the second P-channel MOSFET 412 and the second N-channel MOSFET 416 are tied together. A tank 418 comprising an inductor 420 in series with a capacitor 422 is connected between the drains of the MOSFETs 410, 412, 414, and 416. The gates of the first P-channel MOSFET 410 and the first N-channel MOSFET 414 are connected to the square wave generator 406 at a node labeled as node A. The gates of the second P-channel MOSFET 412 and the second N-channel MOSFET 416 are connected to one side of a modulating circuit or device, such as a phase delay circuit 424 as a node labeled node B. The phase delay circuit 424 is connected to the square wave generator 406 on the other side.

It will be appreciated that if the logic levels at node A and node B are the same, either a logic 0 or 1, then no power is transferred from the voltage source 402 to the tank 418. If the logic levels at node A and node B are opposite, either a 0 at node A and a 1 at node B or a 1 at node A and a 0 at node B, then power is transferred from the voltage source 402 to the tank 418. As used herein, logic 0 refers to the "off" state of the switch or MOSFET, and logic 1 refers to the "on" state of the switch or MOSFET. It will be appreciated that the on and off states are determined by the gate to source voltage in the MOSFETs.

Thus, when a logic 1 is at node A and a logic 0 is at node B, then the first N-channel MOSFET 414 is "on," and the second P-channel MOSFET 412 is "on" so that current flows through the tank 418 there between. The first P-channel MOSFET 410 and the second N-channel MOSFET 416 are both "off." When a logic 0 is at node A and a logic 1 is at node B, then the first P-channel MOSFET 410 is "on," and the second N-channel MOSFET 416 is "on" so that current flows through the tank 418 there between. The first N-channel MOSFET 414 and the second P-channel MOSFET 412 are both "off."

The circuit of FIG. 4 modulates the energy level provided to the tank 418 by varying the phase delay circuit 424. With the phase delay circuit 424, the circuit 400 modulates the phase delay of the wave form provided at the gates of the MOSFETs 410, 412, 414, and 416 to vary the amount of energy in the tank 418.

The phase delay refers to the delay times at nodes A and B. Nodes A and B are either at the same or different phase. By increasing the phase delay, the time that nodes A and B are at different phases is increased and, therefore, the amount of energy in the tank at a given time is increased. Likewise, by decreasing the phase delay, the time that nodes A and B are at different phases is decreased and, therefore, the amount of energy input into the tank is decreased.

Figure 5:
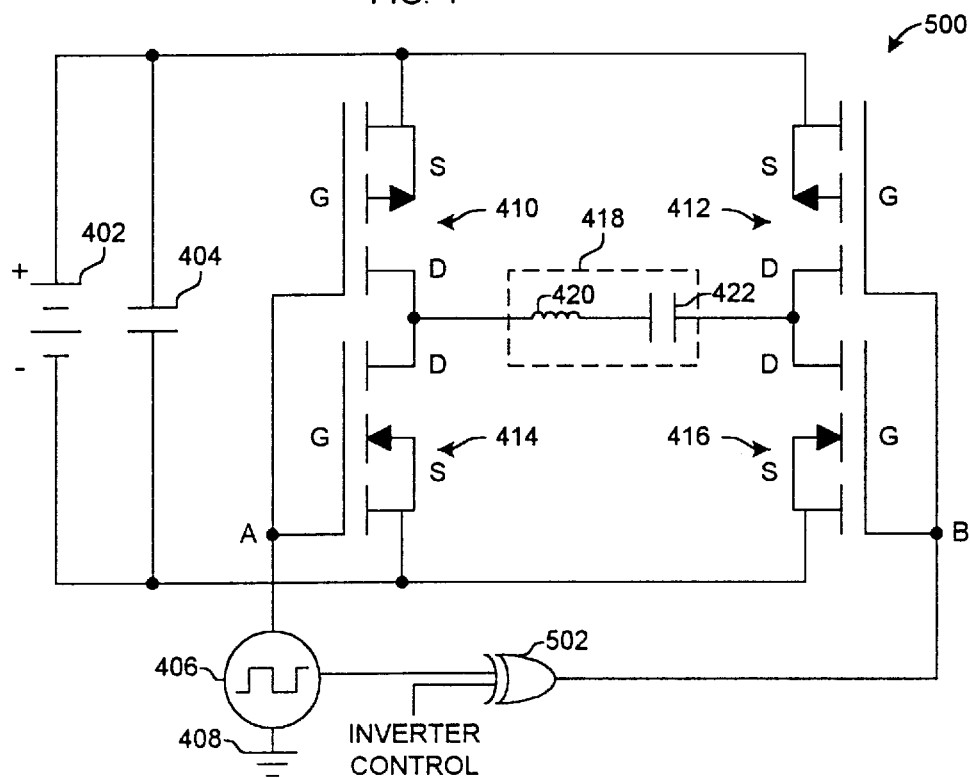
FIG. 5 is a block diagram of a version of the power regulating circuit using an inverter control in accordance with the present invention.

The circuit 500 of FIG. 5 operates similar to the circuit 400 of FIG. 4, except that in FIG. 5 a modulating circuit or device such as an inverter 502 replaces the phase delay circuit 424 of FIG. 4. The inverter 502 is used to provide a binary 0–180 degree phase control between node A and node B for inversion control.

The inverter 502 is likely controlled by a processor (not shown) or other controller by controlling the input to the inverter. Because the inverter 502 is an exclusive OR gate (XOR), the output of the inverter is a logic 1 when the input from the square wave generator 406 is a 0 and the control input to the inverter 502 is a 1. Alternately, the output of the inverter is a logic 1 when the input from the square wave generator 406 is a 1 and the control input to the inverter 502 is a 0. The output from the inverter 502 is a logic 0 if the input from the square wave generator 406 and the control input to the inverter 502 are both 0 or both 1.

By controlling the input to the inverter 502, the phase difference between node A and node B may be increased or decreased. This will in turn increase or decrease, respectively, the energy transferred to the tank 418. The circuit 500 of FIG. 5 allows the control input to the inverter 502 to be changed at any point in the duty cycle of the wave form or several times in the duty cycle.

Figure 6:
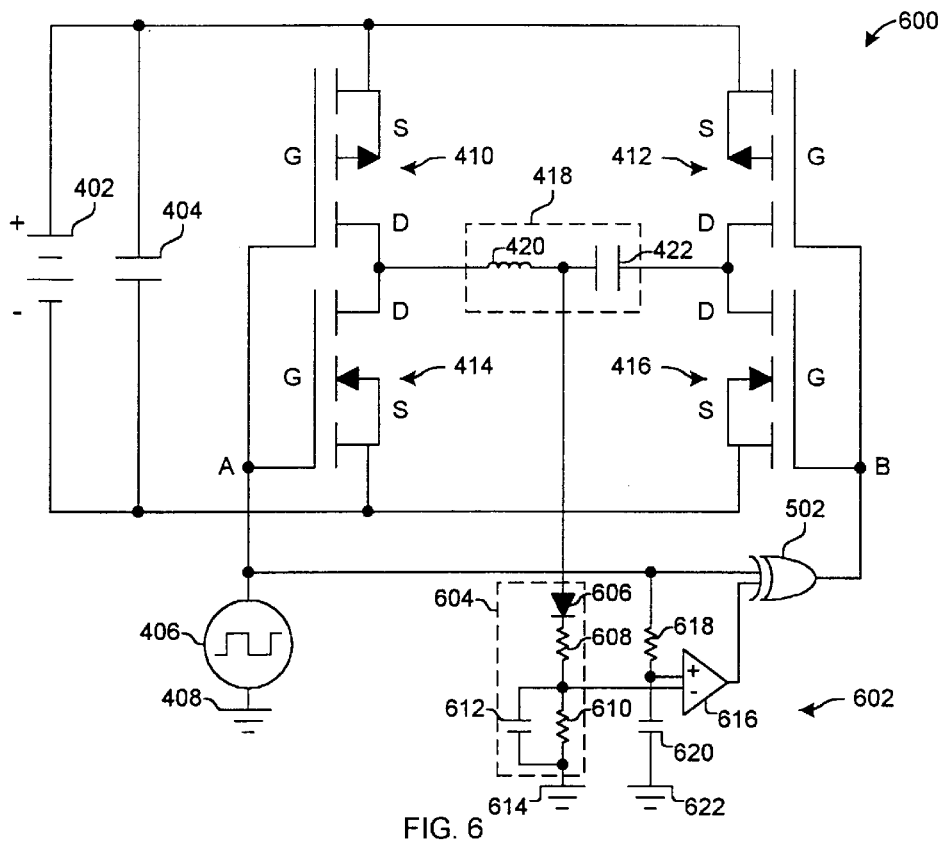
FIG. 6 is a block diagram of a version of the power regulating circuit using a feedback loop in accordance with the present invention.

FIG. 6 illustrates a circuit 600 with a feedback mechanism such as a feedback circuit 602 that is used to control the modulation of the pulse width of the wave forms provided at the gates of the MOSFETs 412 and 416 to provide a fixed energy level to the tank 418 in the presence of variations in the voltage of the power source 402 or in the presence of variations in the tank load. However, it will be appreciated that the pulse width could be modulated for the MOSFETs 410 and 414 in a similar manner. The circuit 600 of FIG. 6 is similar to circuit 500 of FIG. 5, except that the feedback circuit 602 is provided to the circuit of FIG. 6.

The feedback circuit 602 includes a peak follower 604 having a diode 606 connected between the inductor 420 and the capacitor 422 of the tank 418 in series with a first resistor 608 which is in series with a parallel combination of a second resistor 610 and a capacitor 612 connected to ground 614.

The peak follower 604 is a "minus" input to a comparator 616. The "plus" input to the comparator 616 is from a node between a resistor 618 and a capacitor 620 that are used as a threshold level input to the comparator. A feedback from the voltage source 402 may be provided by tying a lead from the positive terminal of the battery to the node of the "plus" input of the comparator 616 with an appropriate resistor between the voltage source and the comparator.

The resistor 618 is connected to the node which is the output of the square wave generator 406 and one input to the inverter 502. The other side of the capacitor 620 is connected to ground 622. The output of the comparator 616 is the other input to the XOR inverter 502.

In the circuit 600 of FIG. 6, the LC tank 418 has a peak voltage level which is the feedback input to the peak follower 604. The resistive elements of the peak follower 604 divide the voltage so that it can be used as an input to the comparator 616.

A triangle wave form is created from the resistor 618 and capacitor 620 combination. The divided feedback voltage is compared in the comparator 616 to a threshold value created with the resistor 618 and capacitor 620 combination. The output of the comparator 616 then is the control input to the XOR inverter 502. When power to the tank 418 is to be decreased, the pulse is cut off short rather than letting the duty cycle run full. The opposite is true if energy to the tank 418 is to be increased.

Thus, for example, when the voltage of the voltage source 402 is high, then the duty cycle which is the output of the inverter 502 is kept small. As the voltage of the voltage source 402 drops, the duty cycle at the output of the inverter 502 is increased to allow more energy into the tank 418. This can feed the energy losses to the tank 418 to allow the tank to drive a variable load.

Figure 7:
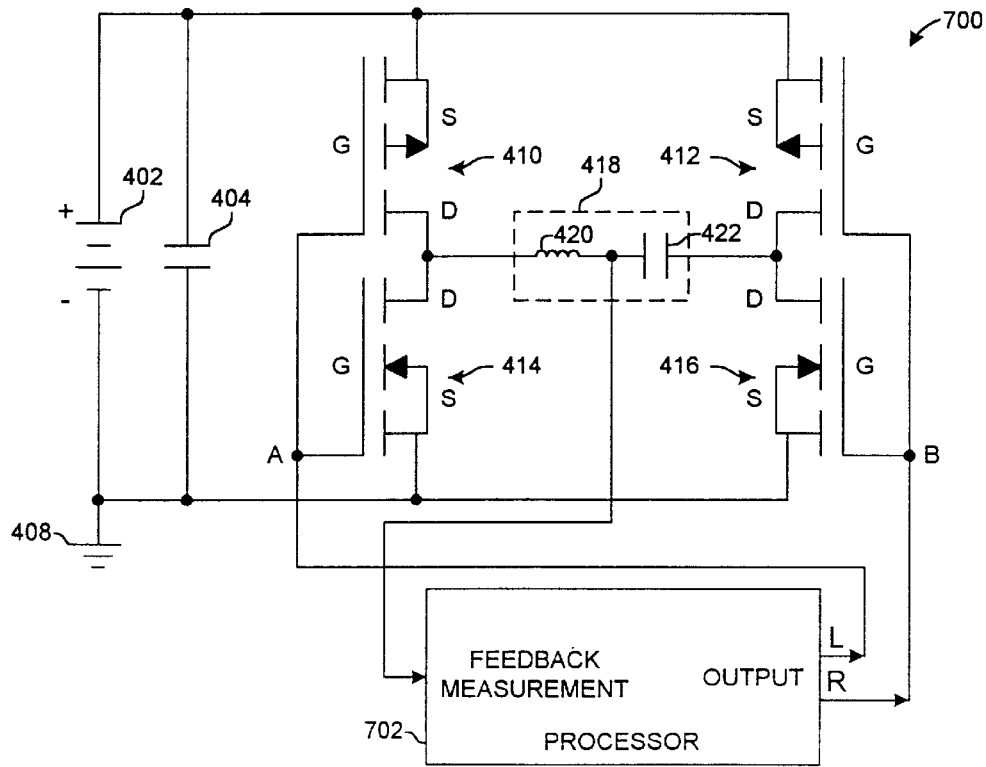
FIG. 7 is a block diagram of a version of the power regulating circuit using a processor for feedback in accordance with the present invention.

In FIG. 7, the inverter 502 and the feedback circuit 602 of FIG. 6 are replaced by another modulating circuit or device combined with a feedback mechanism, such as a processor 702. In addition, it will be appreciated that the processor 702 may have an internal clock/wave generator (not shown).

The processor 702 measures the voltage at the tank 418 for the feedback. The processor 702 processes the feedback with a threshold level of energy to determine if the energy to the tank 418 is to be increased, decreased, or left at the current level.

The processor 702 drives each side of the tank 418 with modulated pulse widths for the duty cycle of the voltage wave form. The processor 702 provides a left output to the gates of the first P-channel MOSFET 410 and the first N-channel MOSFET 414. The processor 702 also provides a right output to the gates of the second P-channel MOSFET 412 and the second N-channel MOSFET 416. The pulse width is increased at node A to let more energy into the tank and/or decreased for the node at B. The pulse width is decreased at node A to decrease the energy in the tank and/or increased for the node at B.

Figure 8:
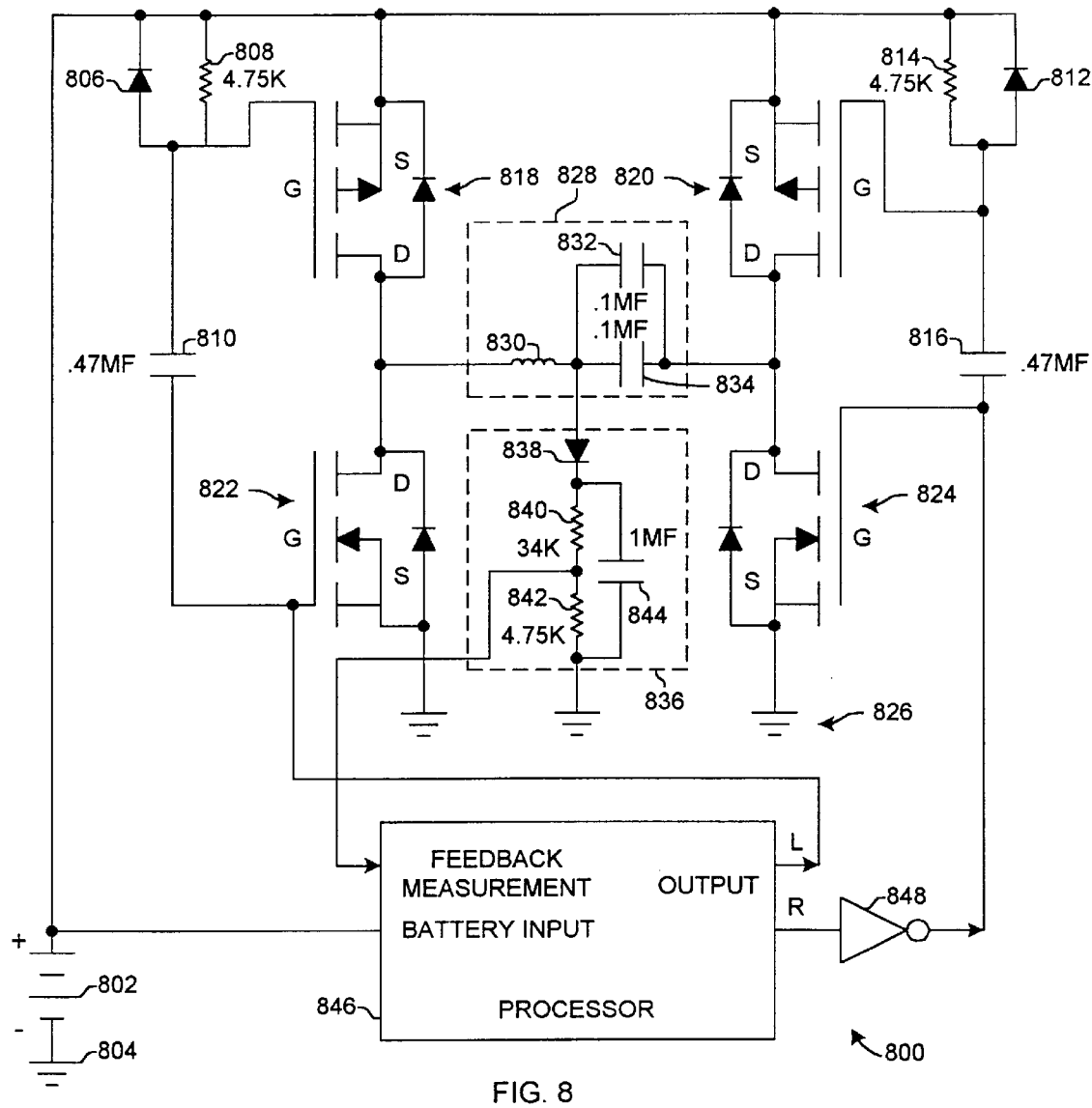
FIG. 8 is a block diagram of a version of the power regulating circuit using a processor and level shifting in accordance with the present invention.

FIG. 8 illustrates a circuit 800 that provides feedback to a processor for controlling the modulation of energy in the tank and that provides level shifting for gating the MOSFETs at a lower voltage level. The circuit 800 has a voltage source 802 connected to ground 804. The voltage source 802 may be constant or not constant. The positive terminal of the voltage source 802 is connected to a level shifting circuit for the left side and for the right side. Each level shifting circuit has level shifting components.

The level shifting components for the left side level shifting circuit comprise a combination of a diode 806 in parallel with a 4.75 KΩ pull-up resistor 808 in series with a 0.47 micro farad capacitor 810. The level shifting components for the right side level shifting circuit comprise a combination of a diode 812 in parallel with a 4.75 KΩ pull-up resistor 814 in series with a 0.47 micro farad capacitor 816.

The circuit 800 has a low impedance drive circuit, such as for example, a first P-channel MOSFET 818, a second P-channel MOSFET 820, a first N-channel MOSFET 822, and a second N-channel MOSFET 824. However, it will be appreciated that other low impedance drive circuits having different components may be used. For example, switches such as single pole, double throw switches may be used in place of the MOSFETs. Moreover, other configurations of FETs or switches may be used.

The first P-channel MOSFET 818 source and the second P-channel MOSFET 820 source are tied to the positive terminal of the voltage source 802. The first N-channel MOSFET 822 source and the second N-channel MOSFET 824 source are tied to ground 826. The drains of the first P-channel MOSFET 818 and the first N-channel MOSFET 822 are tied together. Also, the drains of the second P-channel MOSFET 820 and the second N-channel MOS- FET 824 are tied together. The combination of the first P-channel MOSFET 818, the second P-channel MOSFET 820, the first N-channel MOSFET 822, and the second N-channel MOSFET 824 will be referred to herein as a pair of complementary MOSFETs.

A tank 828 comprising an inductor 830 in series with a parallel combination of a 0.1 micro farad capacitor 832 and another 0.1 micro farad capacitor 834 is connected between the drains of the MOSFETs 818, 820, 822, and 824. The frequency of the tank 828 is 29,430 KHz. However, it will be appreciated that other capacitance values may be selected for inductances in the tank 828 to have a different frequency level.

The gates of the first P-channel MOSFET 818 and the first N-channel MOSFET 822 are connected to opposite sides of the left-side 0.47 micro farad capacitor 810. The gates of the second P-channel MOSFET 820 and the second N-channel MOSFET 824 are connected to opposite sides of the right-side 0.47 micro farad capacitor 816.

A feedback mechanism, such as a feedback circuit 836 is connected to the tank 828 between the inductor 830 and the capacitors 832 and 834. The feedback circuit 836 has a diode 838 which is connected to a 34 KΩ resister 840 which is connected to a 4.75 KΩ resistor 842. A 1 micro farad capacitor 844 is connected parallel to the series resistors 840 and 842. The other side of the 4.75 KΩ resistor goes to ground 826.

The node between the resistors 840 and 842 of the feedback circuit 836 is input into a processor 846 that provides modulation of the low impedance drive circuit and that is part of the feedback mechanism that measures feedback to control the modulation. The processor 846 also has an input from the voltage source 802 to measure the voltage level.

The processor 846 measures the voltage level from the voltage source 802 to determine the level, if any, of the spike in the wave form in the feedback circuit 836 that is attributable to the voltage source. The voltage from the voltage source 802 gets impressed on the sinusoid wave form from the tank 828 feedback. Therefore, to determine the correct feedback, the peak of the feedback wave form is measured, and the spike in the voltage from the voltage source 802 is measured. Then, the amount of voltage in the feedback sinusoid that is attributable to the impressed voltage from the voltage source 802 is subtracted to get the proper feedback value. Outputs from the processor 846 to the appropriate MOSFETs are varied accordingly.

The left output of the processor 846 leads to the gate of the first N-channel MOSFET 822. The right output of the processor 846 leads to an inverter 848 and then to the gate of the second N-channel MOSFET 824.

The level shifting components allow the MOSFETs to switch on with a relatively small source voltage to keep the gate to source voltage swing at the required logic voltages when the source voltage is small. The gate to source voltage typically is from 0 to 5 volts. Because of the capacitors 810 and 816 in the level shifting components, the P-channel MOSFETs' 818 and 820 gates swing from 3 volts to −2 volts, assuming the voltage source is a 3 volt battery. However, the gate of the N-channel MOSFETs 822 and 824 still swing from 5 volts to 0 volts. Therefore, if the gate of the P-channel MOSFETs 818 and 820 are at −2 volts, and the gate of the N-channel MOSFETs 822 and 824 are at 5 volts, then the MOSFETs will switch "on" easily. This, of course, assumes 5 volt logic. Other logic levels may be used however.

Figure 9:
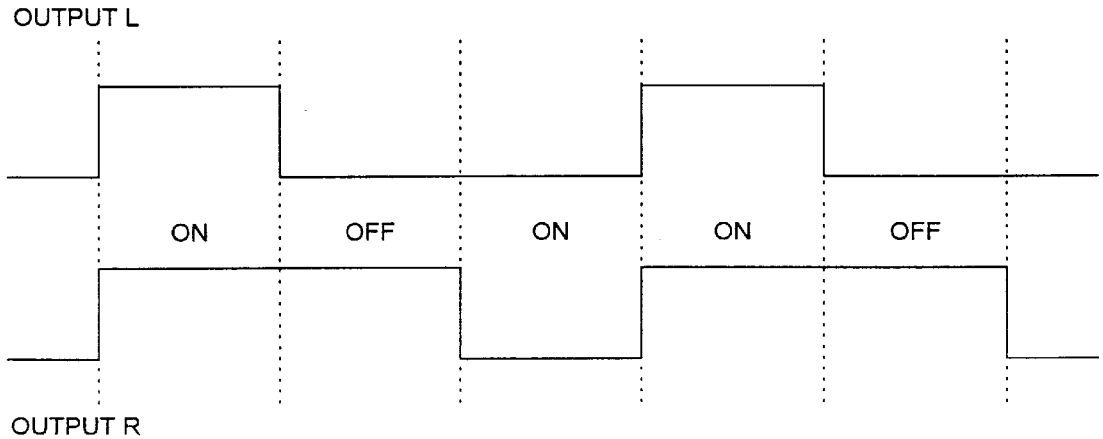
FIG. 9 is diagram of processor output wave forms.

FIG. 9 illustrates the outputs from the processor 846 that have a pulse width and a logic level. When the left output (L) logic level is high, and the logic level of the output for the right (R) also is high, then the right output is inverted at the inverter 848 before being applied to the gate of the second N-channel MOSFET 824, the level shifting, and the gate of the second P-channel MOSFET 820. Thus, the first N-channel MOSFET 822 and the second P-channel MOSFET 820 will be "on" and gated, and energy is input into the tank 828. When the left output logic level is low and the right output logic level of the processor 846 is high, the states at the gates of the MOSFETs 818, 820, 822 and 824 are the same, and no energy is input into the tank 828. When the left output logic level of the processor 846 is low, and the right output logic level is high, then the first P-channel MOSFET 818 and the second N-channel MOSFET 824 are "on," and energy is transferred to the tank 828.

Figure 10:
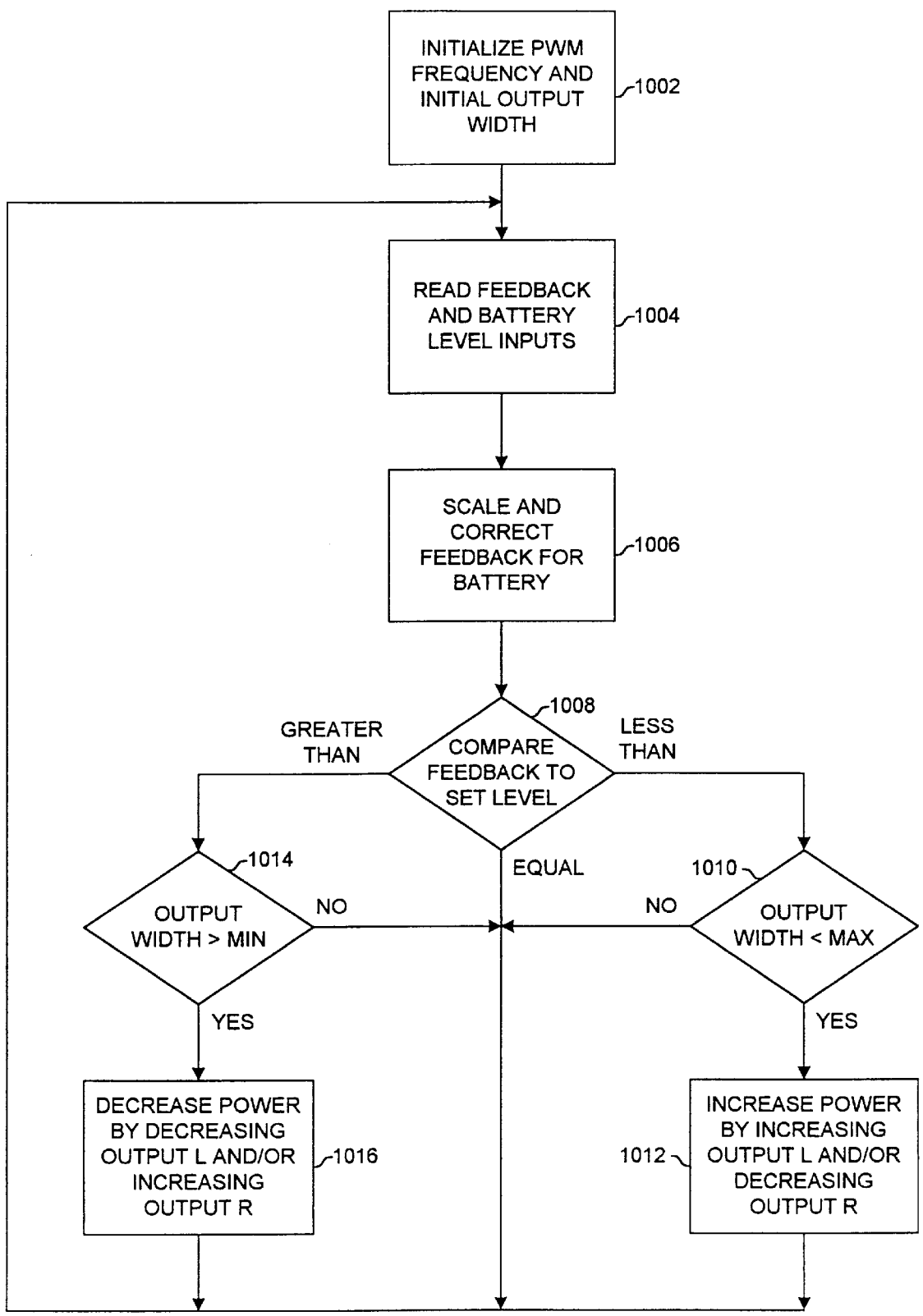
FIG. 10 is a flowchart of software used in the processor of the present invention.

FIG. 10 illustrates the software in the processor 846 of FIG. 8 to determine if the power to the tank 828 is to be increased or decreased. Referring to FIGS. 8–10, the pulse width frequency and initial output pulse width are initialized in the processor 846 (step 1002). While the circuit 800 is operating, the processor 846 reads the feedback from the tank 828 and the input from the voltage source 802 (step 1004). The feedback is scaled and corrected for the impressed voltage source 802 voltage (step 1006). The corrected feedback level then is compared to the set threshold level of voltage which is ideal for the tank 828 (step 1008). If the feedback is equal to the set level at 1008, then the process continues at step 1004.

If the feedback level is less than the threshold level (step 1008), and if the output width of the pulse is less than the maximum allowed pulse width (step 1010), then the energy level to the tank 828 is increased by increasing the pulse width (duty cycle) of left output of the processor and/or decreasing the pulse width (duty cycle) of the right output of the processor (step 1012). If at step 1010 the pulse output width is greater than or equal to the maximum allowed pulse width, then the process continues at step 1004.

If the feedback level is greater than the threshold level (step 1008), and if the output width of the pulse is greater than the minimum allowed pulse width (step 1014), then the energy level to the tank 828 is decreased by decreasing the pulse width (duty cycle) of left output of the processor and/or increasing the pulse width (duty cycle) of the right output of the processor (step 1016). If at step 1014 the pulse output width is less than or equal to the minimum allowed pulse width, then the process continues at step 1004.

Figure 11:
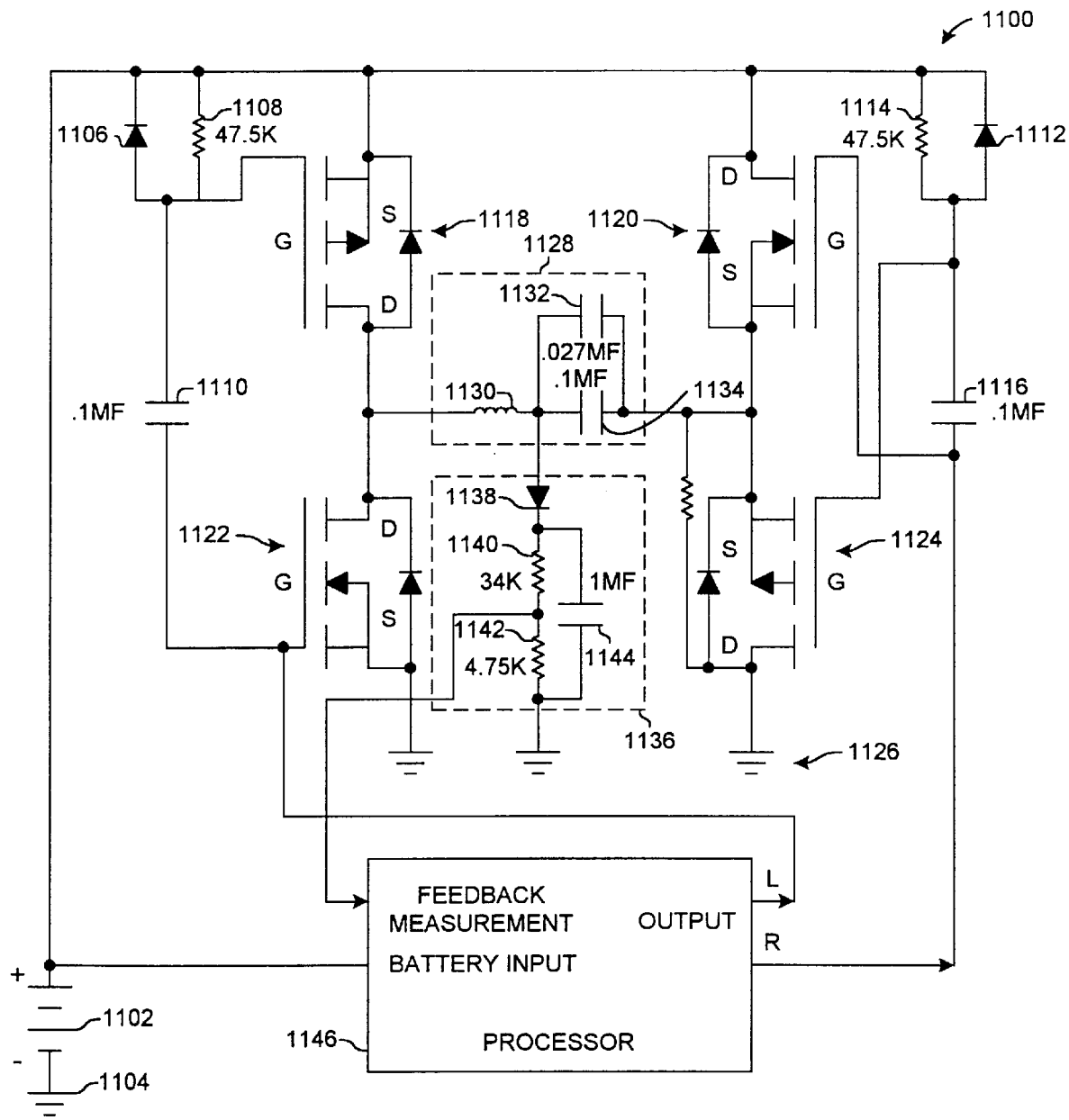
FIG. 11 is a block diagram of a version of the power regulating circuit using a processor and level shifting in accordance with the present invention.

FIG. 11 illustrates another version of the voltage regulating circuit of the present invention. The circuit 1100 of FIG. 11 eliminates an inverter from the right output of the processor. Therefore, the circuit switches the second P-channel MOSFET to an N-channel MOSFET and switches the second N-channel MOSFET with a P-channel MOSFET. In addition, other component values are changed to be compatible with the MOSFETs.

The circuit 1100 provides feedback to a processor for controlling the modulation of energy in the tank and that provides level shifting for gating the MOSFETs at a lower voltage level. The circuit 1100 has a voltage source 1102 connected to ground 1104. The voltage source 1102 may be constant or not constant. The positive terminal of the voltage source 1102 is connected to level shifting circuits for the left side and for the right side, each having level shifting components.

The level shifting components for the left level shifting circuit comprise a combination of a diode 1106 in parallel with a 47.5 KΩ pull-up resistor 1108 in series with a 0.1 micro farad capacitor 1110. The level shifting components for the right side level shifting circuit comprise a combination of a diode 1112 in parallel with a 47.5 KΩ pull-up resistor 1114 in series with a 0.1 micro farad capacitor 1116.

The circuit 1100 has a low impedance drive circuit, such as for example, a first P-channel MOSFET 1118, a first N-channel MOSFET 1120, a second N-channel MOSFET 1122, and a second P-channel MOSFET 1124. However, it will be appreciated that other low impedance drive circuits having different components may be used. For example, switches such as single pole, double throw switches may be used in place of the MOSFETs. Moreover, other configurations of FETs or switches may be used.

The source of the first P-channel MOSFET 1118 and the drain of the first N-channel MOSFET 1120 are tied to the positive terminal of the voltage source 1102. The source of the second N-channel MOSFET 1122 and the drain of the second P-channel MOSFET 1124 are tied to ground 1126. The drain of the first P-channel MOSFET 1118 and the drain of the second N-channel MOSFET 1122 are tied together. Also, the source of the first N-channel MOSFET 1120 and the source of the second P-channel MOSFET 1124 are tied together. The combination of the first P-channel MOSFET 1118, the first N-channel MOSFET 1120, the second N-channel MOSFET 1122, and the second P-channel MOSFET 1124 will be referred to herein as a pair of complementary MOSFETs.

A tank 1128 comprising an inductor 1130 in series with a parallel combination of a 0.027 micro farad capacitor 1132 and a 0.1 micro farad capacitor 1134 is connected between the drains of the MOSFETS 1118 and 1122 and the sources of the MOSFETS 1120 and 1124. The frequency of the tank 1128 is 29,430 KHz. However, it will be appreciated that other capacitance values may be selected for inductances in the tank 1128 to have a different frequency level.

The gates of the first P-channel MOSFET 1118 and the second N-channel MOSFET 1122 are connected to opposite sides of the left-side 0.1 micro farad capacitor 1110. The gates of the first N-channel MOSFET 1120 and the second P-channel MOSFET 1124 are connected to opposite sides of the right-side 0.1 micro farad capacitor 1116.

A feedback circuit 1136 is connected to the tank 1128 between the inductor 1130 and the capacitors 1132 and 1134. The feedback circuit 1136 has a diode 1138 which is connected to a 34 KΩ resister 1140 which is connected to a 4.75 KΩ resistor 1142. A 1 micro farad capacitor 1144 is connected parallel to the series resistors 1140 and 1142. The other side of the 4.75 KΩ resistor goes to ground 1126.

The node between the resistors 1140 and 1142 of the feedback circuit 1136 is input into a processor 1146 that provides modulation of the low impedance drive circuit and that is part of the feedback mechanism that measures feedback to control the modulation. The processor 1146 also has an input from the voltage source 1102 to measure the voltage level.

The processor 1146 measures the voltage level from the voltage source 1102 to determine the level, if any, of the spike in the wave form in the feedback circuit 1136 that is attributable to the voltage source. The voltage from the voltage source 1102 gets impressed on the sinusoid wave form from the tank 1128 feedback. Therefore, to determine the correct feedback, the peak of the feedback wave form is measured, and the spike in the voltage from the voltage source 1102 is measured. Then, the amount of voltage in the feedback sinusoid that is attributable to the impressed voltage from the voltage source 1102 is subtracted to get the proper feedback value. Outputs from the processor 1146 to the appropriate MOSFETs are varied accordingly.

The left output of the processor 1146 leads to the gate of the second N-channel MOSFET 1122. The right output of the processor 1146 leads to the gate of the first P-channel MOSFET 1120.

The circuit 1100 of FIG. 11 operates similarly to the circuit 800 of FIG. 8 except that the first N-channel MOSFET 1120 and the second P-channel MOSFET 1124 provide the inversion for the right output from the processor 1146 instead of using an inverter. The wave form of FIG. 9 and the flowchart of FIG. 10 apply to the circuit 1100 of FIG. 11.

Thus, when the left output (L) is high, and the output for the right (R) also is high, then the first P-channel MOSFET 1118 and the second P-channel MOSFET 1124 will be "on" and gated, and energy is input into the tank 1128. When the left output is low and the right output of the processor 1146 is high, the states at the gates of the MOSFETS 1118, 1120, 1122 and 1124 are the same, and no energy is input into the tank 1128. When the left output of the processor 1146 is low, and the right output is high, then the first N-channel MOSFET 1120 and the second N-channel MOSFET 1122 are "on" and energy is transferred to the tank 1128.

Those skilled in the art will appreciate that variations from the specific embodiments disclosed above are contemplated by the invention. The invention should not be restricted to the above embodiments and is capable of modifications, rearrangements, and substitutions of parts and elements without departing from the spirit and scope of the invention.

what is claimed is:

1. A system for regulating power in a circuit comprising:

a pair of complementary MOSFETs in a bridge configuration;

a tank circuit connected between the pair of complementary MOSFETs;

a voltage source adapted to provide a voltage through the pair of complementary MOSFETs to drive the tank circuit;

a square wave generator adapted to output a square wave to the complementary MOSFETs; and a phase delay circuit connected between the square wave generator and one of the pair of complementary MOSFETs wherein the phase delay circuit is adapted to modulate a phase of the square wave to the one pair of complementary MOSFETs thereby varying an amount of the voltage that is provided through the complementary MOSFETs at a controlled level.

2. A system for regulating power in a circuit comprising:

a voltage source adapted to provide a voltage with a level;

a pair of complementary MOSFETs in a bridge configuration, wherein the pair of complementary MOSFETs comprises two sets of complementary MOSFETs, wherein a first set of complementary MOSFETs creates a first circuit path when gated, wherein a second set of complementary MOSFETs creates a second circuit path when gated;

a tank circuit connected between the pair of complementary MOSFETs and adapted to receive the level of voltage alternately through the first circuit path and alternately through the second circuit path to create an alternating current regulated voltage source;

a processor having a feedback input from the tank, a first output to a first side of opposing MOSFETs, the first side of opposing MOSFETs comprising one MOSFET from the first set of complementary MOSFETs and one MOSFET from the second set of complementary MOSFETs, and a second output to a second side of opposing MOSFETs, the second side of opposing MOSFETs comprising another MOSFET from the first set of complementary MOSFETs and another MOSFET from the second set of complementary MOSFETs;

wherein the processor is adapted to compare the feedback input to a set threshold level to determine a first pulse width having a first logic level to be output on the first output and a second pulse width having a second logic level to be output on the second output so that the level of voltage transferred to the tank is controlled by varying modulations and logic levels of the first pulse width and the second pulse width.

3. The system of claim 2 further comprising a level shifting circuit adapted to shift a gate to source voltage level needed to switch the MOSFETs on.

4. The system of claim 3 wherein the level shifting circuit comprises a diode, a pull-up resistor, and a capacitor.

5. The system of claim 2 further comprising a feedback circuit between the tank and the processor, the feedback circuit configured as a peak follower and adapted to divide the voltage from the tank before the voltage from the tank is input in the processor as the feedback input.

6. The system of claim 2 wherein the processor is adapted to receive an input from the voltage source to determine the voltage source voltage level which is impressed on the feedback input and to subtract the impressed voltage from the feedback input to determine the first pulse width and the second pulse width.

7. The system of claim 2 wherein the processor is adapted to decrease the power in the tank by decreasing the pulse width of the first output.

8. The system of claim 2 wherein the processor is adapted to decrease the power in the tank by increasing the pulse width of the second output.

9. The system of claim 2 wherein the processor is adapted to increase the power in the tank by increasing the pulse width of the first output.

10. The system of claim 2 wherein the processor is adapted to increase the power in the tank by decreasing the pulse width of the second output.

11. The system of claim 2 further comprising a beacon adapted to house the circuit.

12. The system of claim 2 further comprising a boring assembly comprising a boring tool adapted to house the circuit.

13. A system for regulating power in a circuit comprising:

a voltage source adapted to provide a voltage with a level;

a first and a second P-channel MOSFET each having a source, a drain, and a gate, wherein the source of the first P-channel MOSFET and the source of the second P-channel MOSFET are connected to the voltage source at a positive terminal;

a first and a second N-channel MOSFET each having a source, a drain, and a gate, wherein the source of the first N-channel MOSFET and the source of the second N-channel MOSFET are connected to the voltage source at a ground;

a tank circuit connected between the drains of the first P-channel MOSFET and the first N-channel MOSFET and drains of the second P-channel MOSFET and the second N-channel MOSFET so that the voltage level is transferred to the tank through a circuit path through two of the MOSFETs; and a processor having a feedback input from the tank, a first output to the gates of the first P-channel MOSFET and the first N-channel MOSFET, and a second output to the gates of the second P-channel MOSFET and the second N-channel MOSFET;

wherein the processor is adapted to compare the feedback input to a set threshold level to determine a first pulse width having a first logic level to be output on the first output and a second pulse width having a second logic level to be output on the second output so that the level of voltage transferred to the tank is controlled by varying modulations and logic levels of the first pulse width and the second pulse width.

14. The system of claim 13 further comprising a level shifting circuit adapted to shift a gate to source voltage level needed to switch the MOSFETs on.

15. The system of claim 14 wherein the level shifting circuit comprises a diode, a pull-up resistor, and a capacitor.

16. The system of claim 13 further comprising a feedback circuit between the tank and the processor, the feedback circuit configured as a peak follower and adapted to divide the voltage from the tank before the voltage from the tank is input in the processor as the feedback input.

17. The system of claim 13 wherein the processor is adapted to receive an input from the voltage source to determine the voltage source voltage level which is impressed on the feedback input and to subtract the impressed voltage from the feedback input to determine the first pulse width and the second pulse width.

18. The system of claim 13 wherein the processor is adapted to decrease the power in the tank by decreasing the pulse width of the first output.

19. The system of claim 13 wherein the processor is adapted to decrease the power in the tank by increasing the pulse width of the second output.

20. The system of claim 13 wherein the processor is adapted to increase the power in the tank by increasing the pulse width of the first output.

21. The system of claim 13 wherein the processor is adapted to increase the power in the tank by decreasing the pulse width of the second output.

22. The system of claim 13 further comprising a beacon adapted to house the circuit.

23. The system of claim 13 further comprising a boring assembly comprising a boring tool adapted to house the circuit.

24. A system for regulating power in a circuit comprising:

a voltage source adapted to provide a voltage with a level;

a first and a second P-channel MOSFET having a source, a drain, and a gate, wherein the source of the first P-channel is connected to the voltage source at a positive terminal and the drain of the second P-channel MOSFET is connected to ground;

a first and a second N-channel MOSFET each having a source, a drain, and a gate, wherein the drain of the first N-channel MOSFET is connected to the voltage source at the positive terminal and the source of the second N-channel MOSFET is connected to ground, wherein the drain of the first P-channel MOSFET is connected to the drain of the second N-channel MOSFET, and wherein the source of the first N-channel MOSFET is connected to the source of the second P-channel MOSFET;

a tank circuit connected between the drains of the first P-channel MOSFET and the second N-channel MOSFET and sources of the first N-channel MOSFET and the second P-channel MOSFET so that the voltage level is transferred to the tank through a circuit path through two of the MOSFETs; and a processor having a feedback input from the tank, a first output to the gates of the first P-channel MOSFET and the second N-channel MOSFET, and a second output to the gates of the first N-channel MOSFET and the second P-channel MOSFET;

wherein the processor is adapted to compare the feedback input to a set threshold level to determine a first pulse width having a first logic level to be output on the first output and a second pulse width having a second logic level to be output on the second output so that the level of voltage transferred to the tank is controlled by varying modulations and logic levels of the first pulse width and the second pulse width.

25. The system of claim 24 further comprising a level shifting circuit adapted to shift a gate to source voltage level needed to switch the MOSFETs on.

26. The system of claim 25 wherein the level shifting circuit comprises a diode, a pull-up resistor, and a capacitor.

27. The system of claim 24 further comprising a feedback circuit between the tank and the processor, the feedback circuit configured as a peak follower and adapted to divide the voltage from the tank before the voltage from the tank is input in the processor as the feedback input.

28. The system of claim 24 wherein the processor is adapted to receive an input from the voltage source to determine the voltage source voltage level which is impressed on the feedback input and to subtract the impressed voltage from the feedback input to determine the first pulse width and the second pulse width.

29. The system of claim 24 wherein the processor is adapted to decrease the power in the tank by decreasing the pulse width of the first output.

30. The system of claim 24 wherein the processor is adapted to decrease the power in the tank by increasing the pulse width of the second output.

31. The system of claim 24 wherein the processor is adapted to increase the power in the tank by increasing the pulse width of the first output.

32. The system of claim 24 wherein the processor is adapted to increase the power in the tank by decreasing the pulse width of the second output.

33. The system of claim 24 further comprising a beacon adapted to house the circuit.

34. The system of claim 24 further comprising a boring assembly comprising a boring tool adapted to house the circuit.

* * * * *

UNITED STATES PATENT AND TRADEMARK OFFICE
CERTIFICATE OF CORRECTION

PATENT NO. : 5,872,703

DATED : February 16, 1999

INVENTOR(S) : Martin A. Williams, Austin L. Widener and Michael A. Wilson

It is certified that error appears in the above-indentified patent and that said Letters Patent is hereby corrected as shown below:

Title page under Assignee, please delete "Ohio" and insert
--Oklahoma--

Signed and Sealed this

First Day of June, 1999

Attest:

Attesting Officer

Q. TODD DICKINSON

Acting Commissioner of Patents and Trademarks